United States Patent [19]
Tschirky et al.

[11] 3,879,094
[45] Apr. 22, 1975

[54] RADIAL BEARINGS
[75] Inventors: John E. Tschirky; Gary Monroe Crase, both of Long Beach, Calif.
[73] Assignee: Smith International, Inc., Newport Beach, Calif.
[22] Filed: Aug. 15, 1973
[21] Appl. No.: 388,586

[52] U.S. Cl. ........................ 308/230; 308/8; 418/48
[51] Int. Cl. ............................................. E21c 13/04
[58] Field of Search ........ 308/290, 8.2, 237 A, 239, 308/230, 8, 237; 418/48

[56] References Cited
UNITED STATES PATENTS
3,489,231  1/1970  Garrison et al. ...................... 418/48
R27,752  9/1973  Hickernell ............................. 308/8

Primary Examiner—Robert S. Ward, Jr.
Assistant Examiner—Richard A. Bertsch

[57] ABSTRACT

This invention relates to hard metal radial bearings particularly suitable in connection with thrust bearings which are lubricated by erosive fluids passing through the radial bearings as are employed in down-hole drilling motors.

27 Claims, 12 Drawing Figures

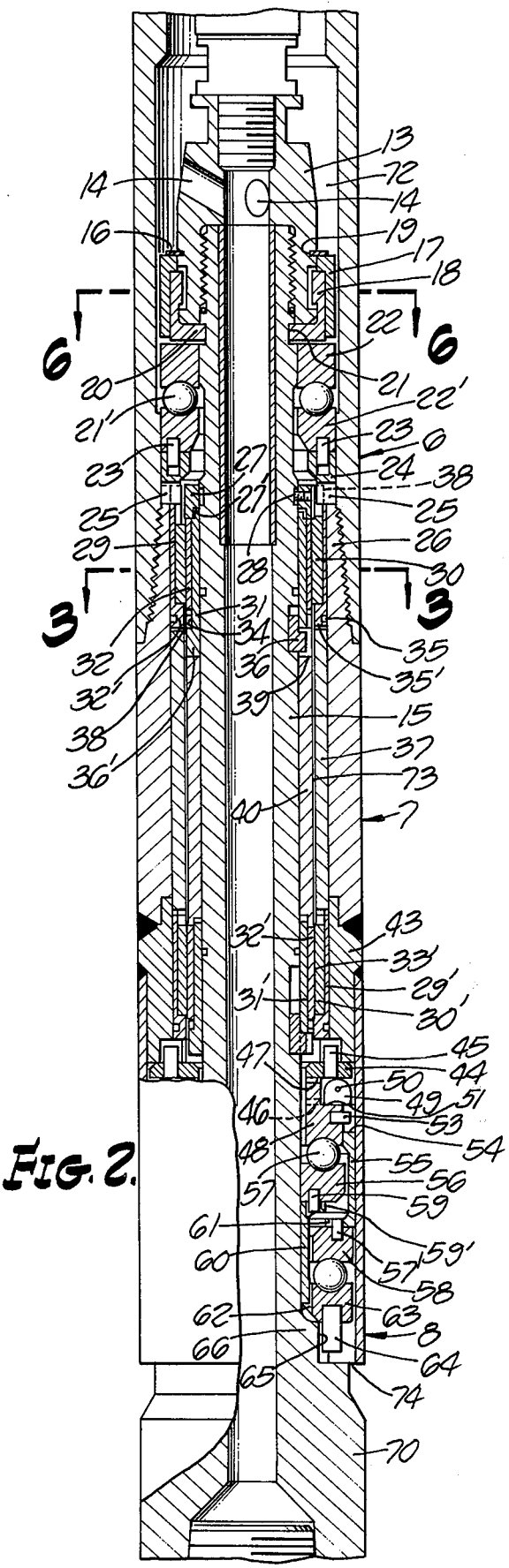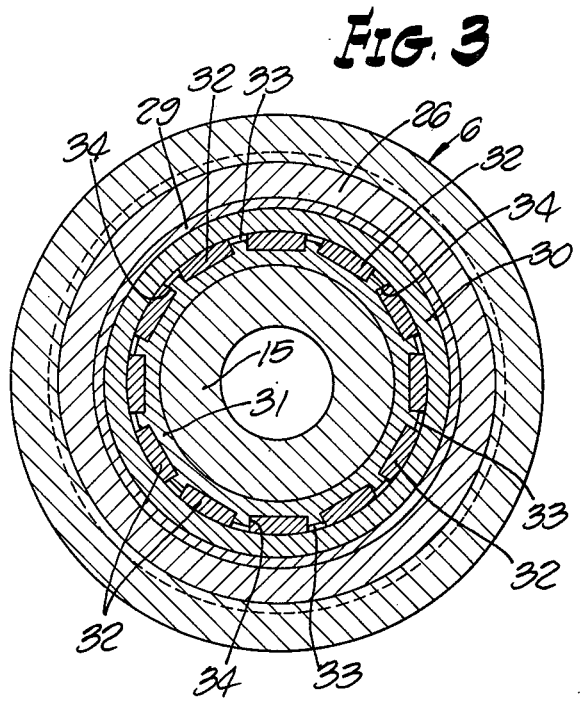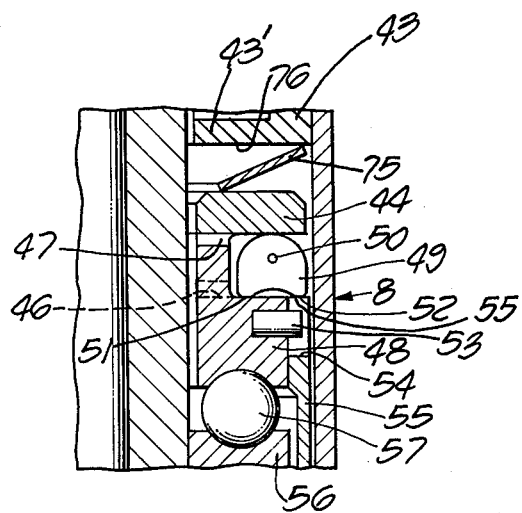

RADIAL BEARINGS

BACKGROUND OF THE INVENTION

The use of motors in bore hold drilling, especially drilling for oil and gas but also in mining operations, has been a standard procedure in the art. Such motors are employed to rotate drills for boring in the earth both for forming a bore hole and also for coring. The motors are also useful in oil field operations, such as tube cleaning, milling operations, cement drilling and other operations where it is desired to rotate a rod at the end of which a tool is to be rotated. We refer to such motors as in-hole drills when designed to be run at the end of a pipe and adjacent to the drill bit. In the usual case, the rotor of the motor and the drill bit rotate with respect to a stator which, in turn, is connected to a conventional drill string composed, in the case of the drilling of well bores, of a "kelly", drill pipe and drill collar as required. This string extends to the surface with the kelly mounted in the rotary table. Where the in-hole motor is a hydraulic motor used as an in-hole motor used in drilling, the liquid is the usual drilling fluid, i.e., mud or gas. It serves its usual function in the drilling operation, returning to the surface carrying the detritus, i.e., cuttings resulting from the drilling operation. However, in this combination, the circulating mud has an additional function and that is to supply the hydraulic power to operate the hydraulic motor.

One of the primary problems resides in the design of the bearing system which will permit operations for periods of economic length.

Because of the failure of bearing seals in the prior art, it has been conventional to employ bearings without seals and to rely on a part of the circulating mud to pass through the bearings to lubricate them. Such bearing systems are shown in E. P. Garrison et al., U.S. Pat. No. 3,516,718 issued Jan. 23, 1970.

When mud lubricated bearings are employed with motors of the helicoidal type, such as have been employed in the prior art in-hole motors, problems arise with respect to limiting the flow of mud through the beaarings and problems arise from the eccentric motion of the rotor. Such motors are shown in Clark U.S. Pat. No. 3,112,801, patented Dec. 3, 1963, and have been widely distributed by Smith International, Inc. under their registered trademark "Dyna-Drill." Such motors are described in the articles by H. M. Rollins, "Bit Guiding Tools Provide Better Control of Directional Drill," World Oil, June 1966, pages 124–135, and are also discussed below.

The prior art solutions for limiting the by-pass of mud through the bearings are shown in the Garrison patent. These include the provision of a grooved rubber radial bearing which also acts as a flow restrictor to limit the fluid by-passing through the bearings so as not to rob unduly the main flow through the bit nozzles required to provide the necessary flow to remove the cuttings.

Since the rotor of the motor rotates in an eccentric manner, it is necessary to convert this motion into a true rotation about a fixed axis so that the bit may be rotated in the proper manner. This is accomplished by connecting the end of the rotor to a connecting rod by means of a universal joint and connecting the connecting rod to a drive shaft by means of a second universal joint.

Problems have arisen in such prior art combination. The rubber radial-bearings, which even in the first place due to molding limitations do not act adequately to restrict the amount of by-pass, deteriorate in use and result in premature failure. This failure includes erosion of the bearing passageways whereby the grooves are washed out. The rubber is torn away from the sleeve to which it was bonded. Bearing failure occurs, in part, due to the excessive flow of mud through the bearings resulting in an excessive erosion of the bearings. An additional difficulty is that the excessive by-pass requires an increase in the volumetric rate of mud flow into the system in order to maintain the required nozzle velocities and pressure drops across the bit nozzles to move the mud cuttings to the surface, and aid in the cutting action.

STATEMENT OF THE INVENTION

This invention in part arises from the observation that we have made that the failure of the rubber bearings of the prior art to function as suitable flow restrictor and radial bearings over a period of time arises from the properties of the materials forming the radial bearing.

The percentage of the fluid by-passed, even with newly formed radial rubber bearings, is excessive because it is difficult to mold such bearings to form passageways through the bearings that will have the desired flow resistance and yet provide a suitable bearing surface which will not have excessive frictional resistance. The erosion of the rubber by the mud is also a problem. It is to be recognized that pressures drop between the stator discharge to the annulus exterior of the drill may be of the order 200 to 1500 pounds per square inch and a volumetric rate of flow from 50 to about 600 gallons per minute, depending upon the depth, nature of the mud, size of the tool, designs of the nozzles of the bit.

The pressure drop and volume rate of flow of the mud through the stator depend on the horsepower requirement and drill and rpm of the drilling effort. This establishes the gallons per minute of mud that must be circulated. The mud input pressure is fixed by the total pressure drop through the drill string, the hydraulic motor, bit nozzle and annulus pressure drop. The volume by-passed through the bearings is subtracted from the flow through the nozzles. The pump must provide for sufficient input to supply the required flow rate and pressure drop. Mud by-passed through the bearings discharges into the hole annulus. It adds to the mud input required to supply that required to be passed through the nozzles and adds to the velocity of the mud in the annulus. The bit manufacturer usually supplies the nozzle pressure drop to give the required lifting effect and cutting action. Furthermore, the depth to which a well may be serviced by a given pump assembly and therefore the limit of bit advance depends on the permissible horsepower required to move the mud through the motor to and through the bit nozzles and return the cuttings to the surface. Any additional demend on the pump, required to supply excessive by-pass is a limitation on the depth to which a given drilling rig can go.

It is difficult to build a rubber bearing which is so finely tuned as to meet these parameters and not permit an excessive flow through the bearings. Furthermore, as has been stated above, pressure drops tend to erode the passsageways in the rubber bearing so that they do not for long retain their original cross-sectional areas.

Further, while the universal joints do a fairly good job in the case of the helicoidal motors of converting the eccentric motion of the rotor to a rotary motion, there remains a residual force on the drive shaft which is transverse to the axis of rotation. This transverse force is periodic in direction, reversing itself on each reversal of the eccentric motion. Additionally, when drilling in steeply dipping formations or in drilling out dog legs, or in drilling deviated holes, particularly when using bent subs at the connecting rod, a thrust is encountered at the bit which is transverse to the bit axis. The result is a working of the rubber of the bearing.

An additional problem with rubber bearings is in the influence of the geothermal effect. The temperature in the bore hole may range up to several hundred degrees above ground temperature, depending on the depth. This adds to the heat developed from friction, which due to the low heat conductivity of rubber is not readily carried away by the circulating mud. Despite the cooling effect of the by-pass fluid, this temperature taken together with the frictional heat of the bearing, and the hysteresis of the rubber resulting from the cyclic transverse thrust of the drive shaft, all operate to impair the physical properties of the rubber. Failure of the rubber bearing is not uncommon.

An additional problem arises, as we have found from the failure in the bond between the rubber and the sleeve to which it is bonded. We have observed large pieces of the rubber bearing that have been torn away from the sleeve in use. We have solved the problem arising from deficiencies of the rubber material by employing instead of rubber, a radial bearing of hard rigid metal. By employing material having a hardness greater than the "Sand" or other solid materials in the circulating mud, we avoid the problem arising from the erosion of the by-pass passageways. The bearings may be formed with restricted passageways which may be accurately to have formed a hardness greater than the "Sand" or other solid materials in the circulating mud, we avoid the problem arising from the erosion of the by-pass passageways. The bearings may be formed with restricted passageways which may be accurately formed to be metering passageways for the mud. Being made of hard metal, problems arising from maintaining the integrity of the radial bearing are avoided. Being made of rigid metal, the residual oscillatory forces transverse to the drive shaft are resisted and a true axial rotation is made possible. Being made of metal of good heat conduction, frictional heat will not build up in the bearing parts and the cooling effect of the mud will be effective to cool the bearing parts.

In the preferred embodiment of our invention as described below, accurate metering characteristics are achieved. The mud is permitted to wet the rubbing surfaces and act as a lubricant. While the radial bearing flow restrictor of our invention may be used with the prior art lubricated thrust bearings as employed in inhole motors, we prefer to use the spring-loaded bearing designs which one of us has invented and which is described in a copending application, Ser. No. 354,954, filed Apr. 27, 1972. The spring-loaded bearings are particularly useful in that they also maintain contact between the balls and races and thus exclude mud at these contact points, and they also act as shock absorbers.

DETAILED DESCRIPTION

This invention will be further described by reference to the drawings of which:

FIG. 2 is a vertical section of that portion of the motor such as is shown in FIG. 1 taken through the portion of the tool below the end of the connecting rod.

FIG. 3 is a section taken on line 3—3 of FIG. 2.

FIG. 5 is a partial section of a modified detail of FIG. 2.

Figure 1:
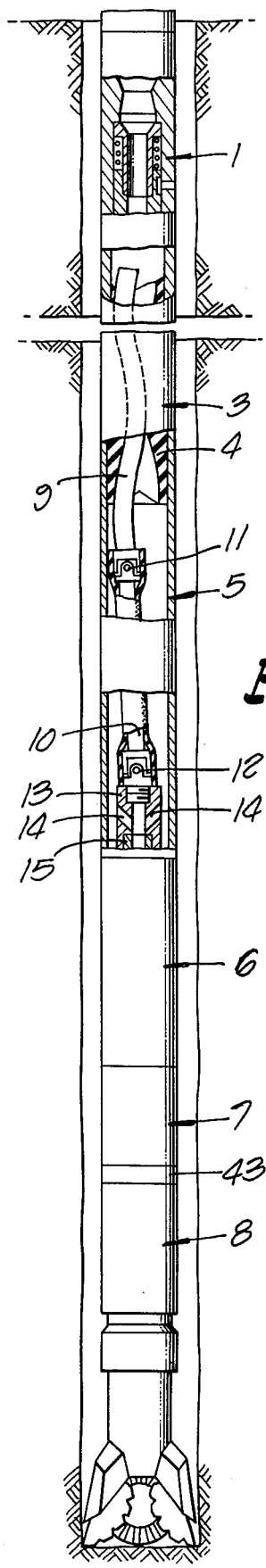
FIG. 1 is a somewhat schematic partial section of a motor assembly to which our invention may be applied.
Figure 6:
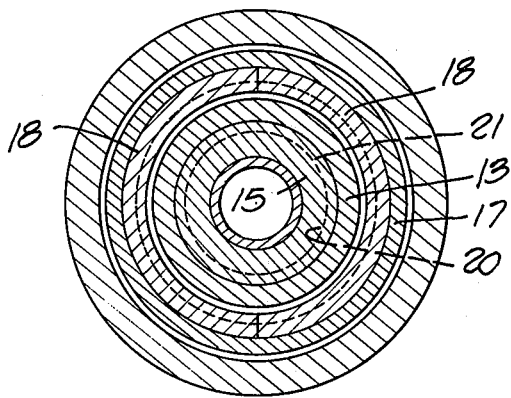
FIG. 6 is a section taken at 6—6 of FIG. 2.

In FIG. 1, a by-pass valve of conventional design is positioned below the drill collar of a conventional oil well drill string. An example is shown in the Clark et al. U.S. Pat. No. 3,005,507 patented Oct. 24, 1961. Since this valve forms no part of this invention and illustrates merely a conventional piece of equipment useful with systems such as the motor shown in FIG. 1, no further description is necessary.

A conventional drill string including the drill collar which inposes the weight on the drill bit may be connected to the by-pass valve by the usual pin and box tool joint. The drill pipe extends to the surface and passes through a rotary table by means of the usual kelly.

THE MOTOR ASSEMBLY

The motor shown in FIG. 1 is a progressing cavity motor. The motor housing 3 (see FIG. 1) is connected to the by-pass assembly 1. The motor housing 3 carries a stator 4 bonded to the interior surface of the housing 3. The connecting rod assembly housing 5 is connected to the housing 3 and the bearing housing 6. The drive shaft assembly housings 6, 7 and 8 contain radial and thrust bearings assemblies. The housing 6 is connected by a pin and box connection to the housing 5 and to the housing 7 and to the lower drive shaft bearing assembly housing 8, all to be more fully described below.

The rotor 9, mounted inside the stator 4, at its lower end is connected to the connecting rod 10 by a universal joint 11. The connecting rod 10 is connected to the tubular drive shaft 15 through the drive shaft cap 13 by a like universal joint 12. (See FIG. 2).

The universal joints may be such as described in the Neilson et al. U.S. Pat. No. 3,260,318 patented July 12, 1966 or in the Neilson et al. U.S. Pat. 3,260,069 patented July 12, 1966.

The connecting rod and universal joints may be enclosed in a flexible cover to protect them from erosion by the mud.

The motor shown is of the helicoidal type. The outer body of the motor that is the stator is composed of an elastomer, for example, a rubberlike compound, which creates a spiral cavity throughout its length to provide a double sprial groove. The passage of fluid through the stator 4 and by the rotor along its length, causes a rotation of the rotor and a movement of the rotor from side to side creating eccentric rotation at the end of the rotor where it is connected to the connecting rod. Because of the universal joints, the eccentric motion is converted into a rotary motion at the drive shaft 15. The fluid as it exits the stator passes through the connecting rod housing 5, around the connecting rod and cap 13 through by-pass annulus 72. The cap 13 is provided with orifices 14 (see FIGS. 1 and 2). At this point, the mud is under very high pressure and passes in considerable volume from the exit of the stator.

The drive shaft cap 13 is screw connected to the drive shaft 15. It carries a retaining ring 16 positioned in a receiving groove 19 in the cap 13 and against which is set the drive shaft collar 17 which locks the split ring 18. The flange 20 of the split ring 18 enters the notch 21 of the drive shaft. The cap 13 carrying the orifice 14 is thus secured from unscrewing.

The upper bearing is formed of the upper race 22 spaced from the bottom of the flange 20 of the split ring 18 for purposes to be described further below. It is composed of the upper race 22, ball 21' and lower race 22'. It is secured by pins 23 which fit in receiving bores in the ring 24 which carries dependent dogs 25 which fit into receiving notches formed in the end of the pin 26 of the housing 7. The ring 27 is mounted in receiving grooves formed in the drive shaft and secured in position by set screws 28. The race 22' is spaced from the shaft and the race 22 is spaced from the interior wall of the housing 6.

The ring 27 is counterbored to provide an annular space 27' underneath the ring and between the ring and the drive shaft.

The flow restrictor of our invention is combined with a radial bearing and is designed so that it will act to minimize the entry of sand or other abrasive particles into the bearing assemblies. It acts as a radial bearing as well as a flow restrictor. The Garrison U.S. Pat. No. 3,489,321, patented Jan. 13, 1970, and No. 3,456,746, patented July 22, 1969, illustrate such flow restrictor bearing assemblies but made of rubber.

The radial bearing flow restrictor assembly is composed of a steel sleeve 29 containing a circular notch. The sleeve 29 is positioned in housing 7 and sealed against the wall of 6 by the O-ring 35. A tungsten carbide sleeve 30 is positioned in the sleeve 29.

The ends of the sleeves 29 and 30 are notched to receive the dogs 25. The complimentary rotating portion of the radial bearing includes a steel sleeve 31 which extends into the annular space 27' between the ring 27 and the drive shaft 15. The sleeve 31 is grooved along its length in a plurality of spaced grooves 34 to receive a plurality of circumambiently spaced tungsten carbide rods 32 spaced from each other.

The external diameter of the sleeve 31 is somewhat less than the internal diameter of the sleeve 30. The tungsten carbide rods 32 are of suitable cross section, for example, rectangular cross section. They are fitted into and held in the grooves 34 as by soldering or other suitable means. The rods extend the length of the groove 34. The external surfaces of the rods 32 are arcuate so as to be concentric with the interior surface of the tungsten carbide cylinder 30 and of substantially the same radius of curvature, thus forming a rubbing fit.

Because of the slightly different diameters of the steel sleeve 31 and tungsten carbide sleeve 30, an interrupted annular space 33 is provided extending between the rods 32. This forms fluid passageway from the outlet of the stator around the cap 13 and through the upper bearing and through the spaced parts above the radial bearing and through the restricted passageways 33.

Figure 7:
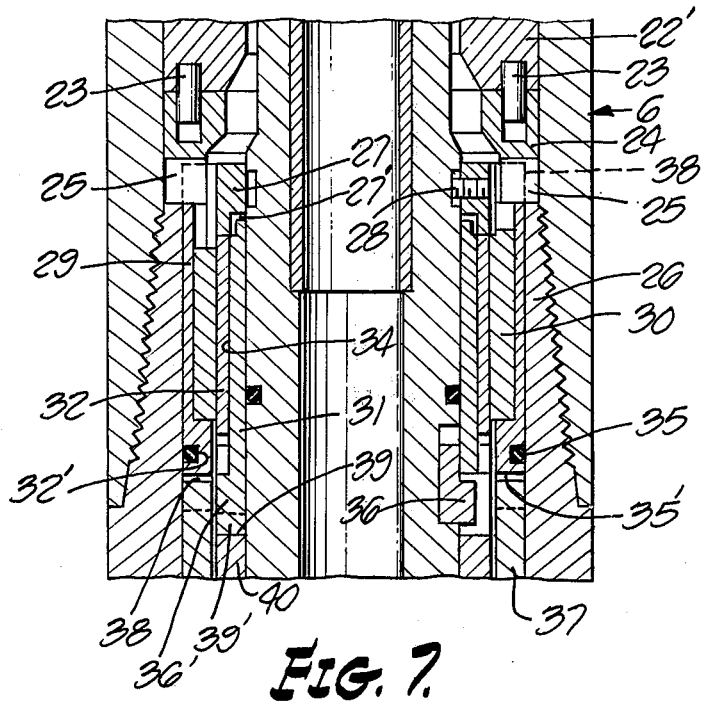
FIG. 7 is an enlarged view of a portion of FIG. 2.

As will be seen, the tungsten carbide sleeve 30 is a stationary member of the rotary bearing being mounted on the stationary housing and held against rotation by the dogs 25 (see FIGS. 5 and 7). The rotary member of the radial bearing is the sleeve 31 keyed by key 36 to the tubular shaft 15. The key 36 enters a notch 39 in the flange 36' of the sleeve 31.

The contiguous surfaces of 30 and the rods 32 form rubbing surfaces suitably smooth and thus act to direct the fluid and contained solids through the passageways. The use of tungsten carbide or other material of similar hardness will preserve the rubbing surfaces against scratching or deformation which may impair the utility of the rotary bearing restrictor. The frictional load is minimized by the fact that the surfaces are continually wetted as the interrupted annular arcuate passageways 33 sweep over the inner surface of 30.

Instead of tungsten carbide, we may use other materials having Knoop or Vickers hardness of about 1800 or more kg/mm square, such as ceramics, for example, alumina and the nitrides or borides provided they have the impact resistance, hardness, tensile strength as well as a Young's modulus suitable to serve in the place of tungsten carbide and particularly have a scratch value to resist the sand and the mud.

The spacer sleeve 37 is notched at 38 at its upper end to receive the dog 35' depending from the sleeve 29. The spacer sleeve 40 is notched at its upper end at 39 to receive the dog 39' depending from 36.

The housing 43 is welded to the housing 7 and the housing 8. It carries a radial bearing flow restrictor of design similar to that of the upper radial bearing flow restrictor assembly. Like parts in the lower radial bearing assembly, shown in FIG. 2, carry the same number as in the upper radial bearing assembly but primed. The steel circularly grooved sleeve 29' carries the tungsten carbide sleeve +' in the groove. The steel sleeve 31' is notched and carries bars 32' spaced apart and with the sleeve 30' form the restricted passageways 33' as in the upper radial bearing.

The sleeves 30' and 29' are notched at their upper ends to receive dogs depending from the spacer sleeve 37. The sleeve 31' is notched at its upper end to receive a dog depending from the sleeve 40.

The lower bearing assembly may be of any suitable design. As shown in FIG. 2, it is formed similarly to that shown in the Garrison et al. U.S. Pat. No. 3,516,718 with some modification in the interlock between the races, the shaft, and the housing.

The lower radial bearing housing 43 is notched to receive pin 45 mounted in the wear plate 44.

The wear plate 44 carries a depending dog 47 which enters into a groove 46 in the upper race 48. The equalizer segment 49 of which there are a number spaced about the shaft 15, are mounted on a wire 50 and are positioned between the wear plate 44 and the race 48. The segments are made with an arcuate lower surface so as to present two pressure points, 51 bearing on the race 48 and pressure point 52 bearing on the end of the sleeve 55.

The race 48 is pinned to the sleeve 55 by the pin 53 which enters the notch 54 formed in the end of the sleeve 55. The ball 57 is positioned between the races 48 and 56. The race 56 is pinned by the pin 59 to the sleeve 60 at the end of 60. The sleeve 55 is pinned to race 58 by pin 57' which enters into the flange 61 at the end of the sleeve 55. The race 63 is notched at 62 to receive the end of the sleeve 60 and is pinned by pin 64 which is received in a notch 65 in the boss 66 above the bit box 70.

There is thus provided a passageway from the annulus 72 around the cap 13, through the annulus between the race 22 and the housing 6 and between the race 22' and the shaft 15, through the flow restrictor grooves 33, through the annular passageway 73 between the spacer sleeves 37 and 40, through the passageways 33' in the lower radial bearing assembly. These passageways communicate with the lower thrust bearing assembly which provides a fluid passageway through the assembly and between the races discharging through the end 74 of the housing 8 between the housing 8 and the shaft 15.

While the radial bearing flow restrictor assembly of our invention described above is useful with any thrust bearing, we prefer to employ spring loaded bearings such as are described in the aforesaid application Ser. No. 354,954.

For example, the bearings described in connection with FIG. 2 may be modified as shown in FIG. 5 by omitting pin 45 and the receiving notch and providing an internal flange 43' on housing 43, introducing a spring, for example, a Belleville spring washer 75, between the wear plate 44 and the end 76 of the housing 43'. However, we prefer to employ the bearing assembly shown in FIG. 4 which is the invention of one of us and is described in the copending application Ser. No. 354,954.

Figure 4:
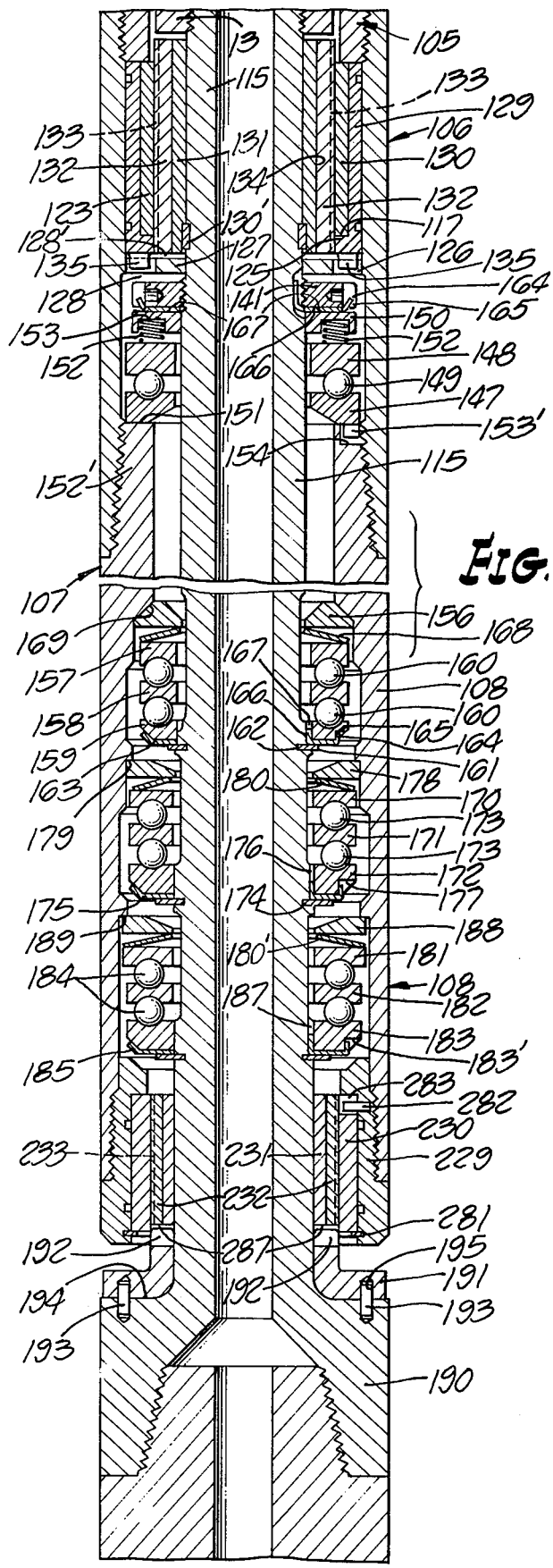
FIG. 4 is a section view of a modification of the bearing shown in FIGS. 2 and 3.

The rotary bearing flow restrictor of FIG. 4 assembly is constructed similarly to those shown in FIGS. 2 and 3, with the modifications shown in FIG. 4 and described below. Parts of the rotary bearing like those described in connection with FIGS. 2 and 3 are numbered with like numbers but 100 greater. The modifications to mount the radial bearing in the construction of FIG. 4 are described below.

The sleeve 131 is spaced below the drive shaft cap 13 into which the tubular drive shaft 115 is threaded and keyed at the key 130', so as not to shoulder against the end of 13 (see FIG. 4).

As in the forms shown in FIGS. 2 and 3, the external diameter of the sleeve 131 is somewhat less than the internal diameter of the sleeve 130. The sleeve 131 is provided with a plurality circumambiently disposed grooves 134 into which are fitted tungsten carbide rods 132 of cross section, as in the form of FIGS. 2 and 3. They are similarly fitted into and held in the grooves 134 and extend the length of the sleeve 131. As described above, the external surface of the rods 132 are arcuate so as to be concentric with the interior surface of the tungsten carbide cylinder 130, thus forming a rubbing fit. Because of the slightly different internal diameters of the steel sleeve 131 from the external diameter of the sleeve 130, an interrupted annular space 133 is provided extending between the rods 132 as in the form of FIGS. 2 and 7.

The end of the sleeve 129 is formed with diametrically spaced dogs 126 which fit into diametrically opposed notches in the ring flange 127 formed integrally with the housing 106. The flange 127 is spaced from the bottom of the radial bearing to provide an annulus 128. The nut 141 is threaded to the exterior of the drive shaft 115. The nut 141 is spaced from the flange 127 at 128 to provide an annular channel. As will be observed, the discharge of fluid from the restricted passageways 133 enters the annulus 128', and passes around the dogs 135 through the notches 126 into the annulus 128.

As in the case of the radial bearings of FIG. 2, instead of tungsten carbide, we may use other materials, as described previously.

The upper bearing assembly shown in FIG. 4 composed of the races 148 and 147 and balls 149 together with the pressure plate 150 and associated springs 152 set in the spring retaining bores 153 form the upper bearing assembly. The nut 141 is screwed to the shaft and locked by the lock washer 166 carrying a finger fitting into a vertical groove 167 and having a plurality of end fingers 164 which are bent up to fit into a number of end grooves 165 formed in the active surface of the nut. The assembly supports the weight of the rotor, connecting rod, drive shaft and drill bit when the bit is raised off bottom by means of the drilling lines conventionally used in oil well drilling. In the form shown in FIG. 4, the tool is in position as it would be with a load imposed on the bit by the drill string including the housings 105, 106, 107 and 108 through the medium of the drive shaft as will be more fully described below.

Attention is drawn to the provision of clearance between the end of the drive shaft cap 13 (see FIG. 4) and the radial bearing sleeve 131 and rods 132 and the provision of annulus 128 and annulus 128'. Clearance is also provided between the top of the pins 135 and the slots 126. The purpose of these clearances will be further described below.

When the tool is in the position shown in FIG. 4, as with the bit in drilling position on bottom, with the load of the drill string and housing on the lower bearings, the load is off the upper thrust bearing. The nut 141 exerts a sufficient compression of the springs 152 via plate 150 to hold races 148 and 147 snugly against the balls 149. The race 147 is positioned on top of the end 151 of the pin 152' of the housing 107. The dog 153 integrally formed with the race 147 fits into an endnotch 154 positioned in the end 151.

The housing 108 is of enlarged diameter ending in a beveled shoulder 169 against which is positioned the load plate 156. The races 157, 158, and 159 and balls 160 form an upper tandem bearing assembly. This assembly is supported on the retaining ring 161 positioned in groove 162 of the drive shaft 115.

The lowermost race 159 is locked in position on the drive shaft 115 by means of a lock washer 163 having extended fingers 164 which are bent up to enter notches 165 in the outer surface of race 159 and has internal finger 166 set in a receiving groove 167 in the shaft 115. The Belleville spring 168 is positioned between the race 157 and the load-transmitting pressure plate 156 seated against the beveled shoulder 169.

A similar bearing assembly is provided, composed of races 170, 171 and 172 and balls 173 which form a second set of tandem bearings. The lowest race 172 is supported on the retainer ring 174.

The lower race is locked in position on the drive shaft by means of a lock washer 175 similar to lock washer 163. The internal finger is positioned in the groove 176 and the external fingers in the circumferentially spaced end notches 177. The pressure plate 178 is seated against the internal shoulder 179 with the Belleville spring 180 positioned between the pressure load transmitting plate 178 and the upper race 170.

Similar arrangement is provided in connection with the lowest tandem bearing assembly composed of the races 181, 182, and 183 and balls 184. Race 183 has a plurality of circumambiently arranged notches 183'. The lock washer 185 has a structure similar to the structure of the lock washer 163. The external fingers of the lock washer are bent up into the notches 183' spaced about the circumference of the race 183. The internal finger is bent up into the groove 187 in the manner similar to that described in connection with the lock washer 163. The load transmitting plate is positioned underneath the internal ledge 189 to bear on the Belleville spring 180' mounted between the pressure plate 188 and the race 181.

The end radial bearing assembly is constructed similarly to the upper radial bearing assembly and that described in connection with FIG. 2 with some modifications as will be described below, like parts bearing the same number as in the radial bearings in FIG. 2 but with numbers which are 200 greater.

The outer tungsten carbide cylinder 230 is mounted in the fitting 229 and sealed by O-rings and held in position by retaining ring 281 and anti-rotation screw 282 which enters the notch 283 in 230.

The complementary steel sleeve 231 is mounted on the surface of the drive shaft 115. It carries tungsten carbide rods 232, in grooves and spaced from each other to form restricted passageways 233 as in the upper radial bearing.

The sleeve 231 is locked to the shaft 155 and the sleeve 229 is locked to 230.

The drill bit box 190 is formed integrally with the drive shaft 115 at the end thereof. The box carries a fitting 191 which has dogs 192 diametrically arranged which are adapted to fit into the notches 287 at the ends of 231 and 232. The fitting 191 is located on the drill bit box shoulder 194 by pins 193 positioned in the box 190 and by entry into the bores 195.

As stated above, the assembly as shown in FIG. 4 shows the parts with the load on the lower bearing as if the weight of the drill string was on the bit as in drilling position. In that case, the dogs 192 are still entered into the slots 287. The load transmitted to plates 156, 178, and 188 has partially compressed the Belleville springs.

When the drill string is raised to bring the bit off bottom, the load on the Belleville springs is reduced but remains sufficiently loaded to hold the races snugly against the balls. The housings and shaft have moved axially relative to each other. As described above, the weight of the rotor, connecting rod and drive shaft is now on the pressure plate 150 and via springs 152 on the upper thrust bearing.

Figure 8:
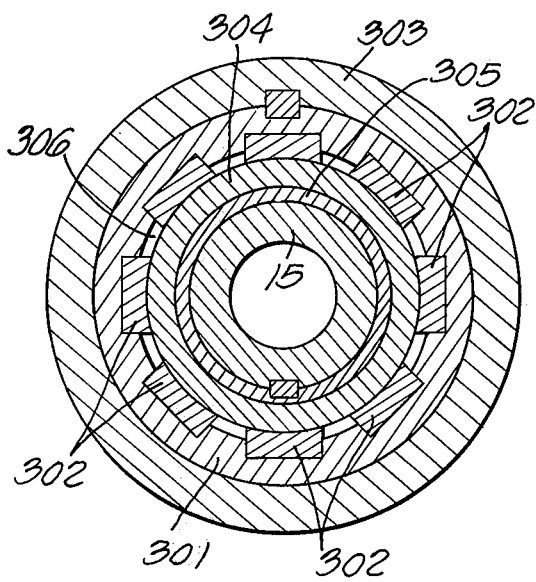
FIG. 8 is a section on line 3—3 of a modification.

FIG. 8 shows a modification of the radial bearing of FIGS. 1 through 7 in which the sleeves carrying the tungsten carbide elements are mounted in reverse to that shown in FIGS. 1 through 7. The steel sleeve 301 carrying the tungsten carbide bars 302 is keyed to the interior of the housing 303 and carries the tungsten carbide bars 302 in a manner similar to 31 of FIG. 7.

The tungsten carbide sleeve 304 is mounted on the steel sleeve 305 in a manner similar to the tunsten carbide sleeve 30 shown in FIG. 7 and the steel sleeve 305 is mounted by means of a suitable key on shaft 15 in a manner similar to that shown in FIG. 7. The steel sleeves are interlocked with the parts above and below the ends of the sleeves in a manner similar to that shown in connection with FIGS. 1 through 7. It will be observed, however, that the steel sleeve mounted on the shaft carries the tungsten carbide sleeve while the steel sleeve mounted on the interior of the housing carries the circumambiently spaced bars 302. The internal diameter of the steel sleeve 301 is greater than the external diameter of the tungsten carbide sleeve 304 thus providing the interrupted annular passageway 306 extending the full length of the sleeves and forming the fluid communication between the ends of the sleeves.

Figure 9:
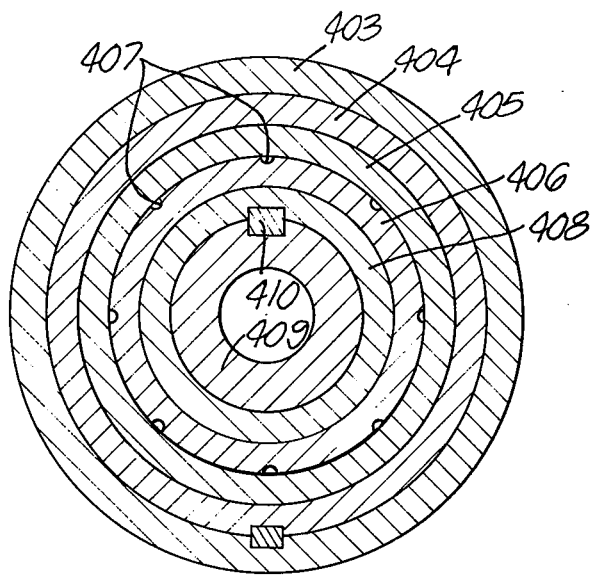
FIG. 9 is a sectional view through a modification of the bearing of our invention.
Figure 10:
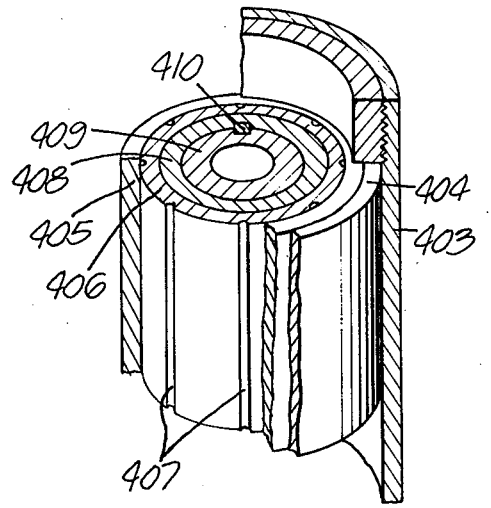
FIG. 10 is a prospective view, partly broken away, of the modification of FIG. 9.

FIGS. 9 through 12 show a modification of our invention, by which the hard material bearing is formed of two sleeves of the hard material referred to above and mounted on the shaft and housing in the manner described above. As shown in FIGS. 9 and 10, the grooves 407 are formed in the inner bearing sleeve 406, mounted in the sleeve 408, keyed to the shaft 409 by the key 410. The bearing sleeve 405 is mounted on the sleeve 404 in the housing 403.

Figure 11:
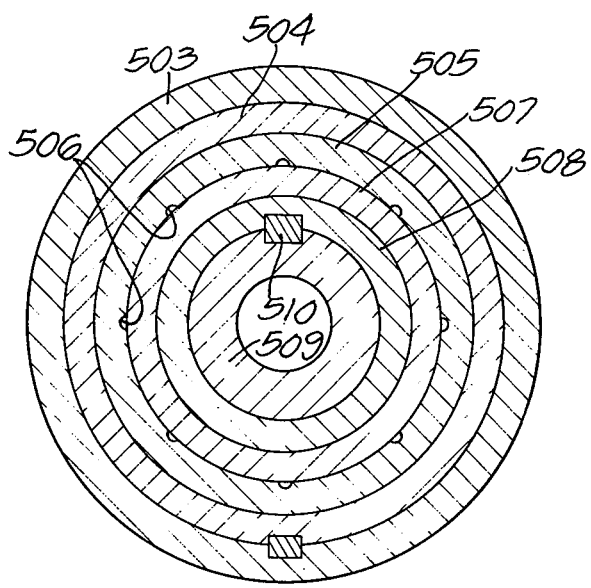
FIG. 11 is a sectional view of another modification of our invention.
Figure 12:
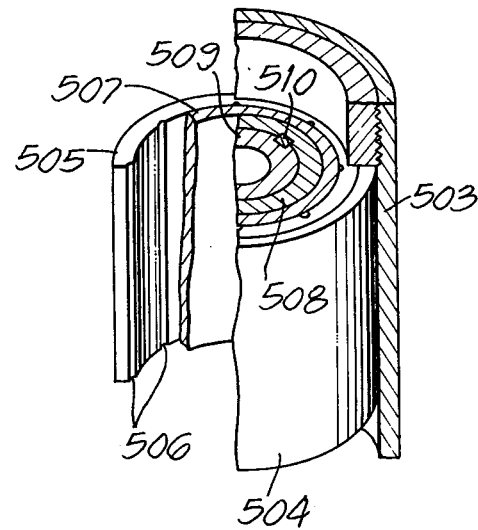
FIG. 12 is a prospective view, partly broken away, of the modification of FIG. 11.

In FIGS. 11 and 12 the grooves 506 are formed in the outer bearing sleeve 505, mounted in sleeve 504 in the housing 503. The inner bearing sleeve 508 is mounted on the shaft 509 by the key 510.

We claim:

1. In a fluid motor assembly including a motor, a drive shaft, and a housing for said drive shaft, a radial bearing between said drive shaft and said housing, said radial bearing comprising a housing member and a shaft member, a tungsten carbide sleeve mounted on one of said members and a tungsten carbide complementary bearing mounted on the other of said members in rubbing relationship to said bearing member, fluid passageways through said bearing.

2. In the fluid motor of claim 1, a second radial bearing positioned between said shaft and said housing and positioned between said thrust bearing and the end of said housing comprising a second tungsten carbide sleeve, a second tungsten carbide complementary bearing member mounted on said shaft in rubbing relationship to said sleeve.

3. In the fluid motor of claim 1, passageways between the said tungsten carbide sleeve and said complementary tungsten carbide bearing member extending through said rotary bearing and communicating with said by-pass passageway and with the said thrust-bearing housing.

4. In the fluid motor of claim 3, a second radial bearing positioned between said shaft member and said housing member and positioned between said thrust bearing and the end of said housing member, said second radial bearing comprising a second tungsten carbide sleeve mounted on one of said members, a second tungsten carbide complementary bearing mounted on the other of said members in rubbing relationship to said second tungsten carbide sleeve, a fluid passageway through said second radial bearing communicating with said thrust-bearing housing above the said second radial bearing and with the end of said housing.

5. In a fluid motor, which includes a rotor, a stator, a tubular drive shaft connected to said rotor, housing for said drive shaft, and fluid passageways into the stator, an outlet from said stator and into and through the tubular drive shaft, a by-pass passageway connected to said stator outlet, the improvement which includes a thrust bearing assembly mounted between said housing and said drive shaft in thrust transmission relationship between said housing and said shaft, radial bearings in said housing between said housing and said shaft and positioned in said housing between said thrust bearing and said stator, comprising a tungsten carbide sleeve mounted in said housing, tungsten carbide complementary bearing mounted on said shaft in rubbing relationship to said first-mentioned bearing member.

6. In the fluid motor of claim 5, a second radial bearing between said housing and said shaft and positioned in said housing between said thrust bearing and the end of said housing, comprising a tungsten carbide sleeve mounted in said housing, tungsten carbide complementary bearing mounted on said shaft in rubbing relationship to said first-mentioned sleeve.

7. In the fluid motor of claim 5, passageways between the said tungsten carbide sleeve and said complementary tungsten carbide bearing member extending through said rotary bearing and communicating with said by-pass passageway and with the said thrust-bearing housing.

8. In a fluid motor, which includes a rotor, a stator, a tubular drive shaft connected to said rotor, housing for said drive shaft, and fluid passageways into the stator, an outlet from said stator and into and through the tubular drive shaft, a by-pass passageway connected to said stator outlet, the improvement which includes a thrust bearing assembly mounted between said housing and said drive shaft in thrust transmission relationship between said housing and said shaft, radial bearings in said housing between said housing and said shaft and positioned in said housing between said thrust bearing and said stator, comprising a tungsten carbide sleeve mounted in said housing, tungsten carbide complementary bearing mounted on said shaft in rubbing relationship to said first-mentioned bearing member.

9. In the fluid motor of claim 8, a second radial bearing between said housing and said shaft and positioned in said housing between said thrust bearing and the end of said housing, tungsten carbide complementary bearing mounted on said shaft in rubbing relationship to said first-mentioned sleeve.

10. In the fluid motor of claim 8, a second radial bearing positioned in said housing between said shaft and housing and positioned between said thrust bearing and the end of said housing, said second radial bearing comprising a tungsten carbide sleeve mounted in said housing, tungsten carbide complementary bearing mounted on said shaft in rubbing relationship to said sleeve, fluid passageway through said second radial bearing communicating with said thrust-bearing housing above the said radial bearing with the end of said housing.

11. In combination, a housing member, a shaft member, a radial bearing mounted between the housing member and the shaft member, said radial bearing including a tungsten carbide sleeve member mounted on one of said members, a tungsten carbide complementary bearing member mounted in said bearing in rubbing relationship with said tungsten carbide sleeve.

12. A radial bearing adapted for mounting between a housing member and a shaft member, a tungsten carbide sleeve adapted for mounting on one of said members, a tungsten carbide complementary bearing member adapted for mounting on the other of said members in rubbing relationship with said tungsten carbide sleeve, said tungsten carbide complementary bearing member including a steel sleeve of exterior diameter less than the interior diameter of the first-mentioned tungsten carbide sleeve, a plurality of tungsten carbide bars mounted circumambiently about said lastnamed sleeve and in rubbing contact with said first-mentioned sleeve, interruped annular passageways between said bars and between said first-mentioned tungsten carbide sleeve and the sleeve adapted for mounting on said shaft.

13. In a fluid motor assembly including a motor, fluid input means to said motor and a drive shaft member, connected to said motor, a housing member for said drive shaft, a radial bearing between said drive shaft and said housing, said radial bearing comprising a tungsten carbide sleeve member mounted on one of said members, a tungsten carbide complementary bearing member mounted in rubbing relationship to said sleeve member, passageway extending through one of said tungsten carbide members to pass fluid discharging from said motor.

14. The fluid motor of claim 13, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, a by-pass passageway from said inlet to said passageway through said tungsten carbide member.

15. In the fluid motor of claim 13 said radial bearing positioned between said shaft and said housing and positioned between said thrust bearing and the said stator.

16. In a motor assembly including a motor and a drive shaft, a housing for said drive shaft, a radial bearing between said drive shaft and said housing, said radial bearing comprising a housing member and a shaft member, a tungsten carbide sleeve mounted on one of said members, a tungsten carbide complementary bearing member mounted on the other of said members in rubbing relationship to said sleeve member, said tungsten carbide complementary bearing member including a steel sleeve of exterior diameter less than the interior diameter of the first-mentioned tungsten carbide sleeve, a plurality of tungsten carbide bars mounted circumambiently about said last-named steel sleeve and in rubbing contact with said first-mentioned tungsten carbide sleeve, interrupted annular passageways between said bars and between said first-mentioned tungsten carbide sleeve and the sleeve adapted for mounting on said shaft.

17. In a fluid motor, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a tungsten carbide sleeve mounted on one of said members, tungsten carbide complementary bearing member mounted on the other of said members in rubbing relationship to said sleeve, said passageways through said tungsten carbide member communicating with said thrustbearing housing.

18. In a fluid motor, which includes a rotor, a stator, a drive shaft connected to said rotor, housing for said shaft, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a tungsten carbide sleeve mounted on one of said members, tungsten carbide complementary bearing member mounted on the other of said members in rubbing relationsip to said sleeve, said radial bearing positioned between said shaft and said housing and positioned between said thrust bearing and the said stator, a second radial bearing positioned between said shaft member and said housing member and positioned between said thrust bearing and the end of said housing member, said second radial bearing comprising a second tungsten carbide sleeve mounted on one of said members, a second tungsten carbide complementary bearing mounted on the other of said members in rubbing relationship to said second tungsten carbide sleeve.

19. In a fluid motor, which includes a rotor, a stator, a drive shaft member connected to said rotor, housing member for said drive shaft member, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a tungsten carbide sleeve mounted on one of said members, tungsten carbide complementary bearing member mounted on the other of said members in rubbing relationship to said sleeve, in which said complementary tungsten carbide bearing comprises a sleeve, a plurality of tungsten carbide bars mounted circumambiently about said sleeve and in rubbing contact with said firstnamed sleeve, said second-named sleeve being of exterior diameter less than the interior diameter of said firstnamed sleeve, interrupted annular passageways between said bars and between said first-mentioned tungsten carbide sleeve and said last-named sleeve.

20. In a fluid motor, which includes a rotor, a stator, a drive shaft member connected to said rotor, housing member for said drive shaft member, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a tungsten carbide sleeve mounted on one of said members, tungsten carbide complementary bearing member mounted on the other of said members in rubbing relationship to said sleeve, a by-pass passageway in said housing and connected to said outlet, passageways between the said tungsten carbide sleeve and said complementary tungsten carbide bearing member extending through said rotary bearing and communicating with said by-pass passageway and with the said thrust-bearing housing, a second radial bearing positioned in said housing between said thrust bearing and the end of said housing, said radial bearing comprising a second tungsten carbide sleeve mounted in one of said members, a second tungsten carbide complementary bearing mounted on the other of said members in rubbing relationship to said sleeve.

21. In a fluid motor, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, radial bearings in said housing between said shaft member and said housing member, said radial bearing comprising a tungsten carbide sleeve mounted on one of said members, tungsten carbide complementary bearing member mounted on the other of said members in rubbing relationship to said sleeve, passageways between the said tungsten carbide sleeve and said complementary tungsten carbide bearing member extending through said rotary bearing and communicating with said by-pass passageway and with the said thrust-bearing housing, a second radial bearing positioned in said housing between said thrust bearing and the end of said housing, said radial bearing comprising a second tungsten carbide sleeve mounted in one of said members, a second tungsten carbide complementary bearing mounted on the other of said members in rubbing relationship to said sleeve, in which said complementary bearing includes a second sleeve of exterior diameter less than the interior diameter of the tungsten carbide sleeve, and is mounted on one of said members, a plurality of tungsten carbide bars mounted circumambiently about said second sleeve in rubbing contact with said last-named tungsten carbide sleeve, interrupted annular passageways between said bars and between said tungsten carbide sleeve and the second sleeve mounted on the other of said members, said passageways communicating with said housing member above said second radial bearing and with the end of said housing member.

22. In a fluid motor assembly including a motor, a drive shaft member, and a housing member for said drive shaft, a radial bearing between said drive shaft and said housing, said radial bearing comprising a housing member and a shaft member, a tungsten carbide sleeve mounted on one of said members and a tungsten carbide complementary bearing mounted on the other of said members in rubbing relationship to said bearing member, in which said complementary tungsten carbide complementary bearing contains tungsten carbide bars mounted circumambiently about a sleeve and in rubbing contact with said first-named sleeve, said second-named sleeve being of exterior diameter less than the interior diameter of said first-named sleeve, interrupted annular passageways between said bars and between said first-mentioned tungsten carbide sleeve and said last-named sleeve.

23. In the motor of claim 22, a second radial bearing positioned in said housing between said thrust bearing and the end of said housing, said radial bearing comprising a second tungsten carbide sleeve mounted in one of said members, a second tungsten carbide complementary bearing mounted on the other of said members in rubbing relationship to said sleeve.

24. In the motor of claim 23, in which said second radial bearing positioned in said housing between said housing member and said shaft member and positioned between the said thrust bearing and the end of said housing, said second radial bearing including a second sleeve of exterior diameter less than the interior diameter of the second tungsten carbide sleeve, mounted on one of said members, a plurality of tungsten carbide bars mounted circumambiently about said last-named sleeve in rubbing contact with said last-named tungsten carbide sleeve, interrupted annular passageways between said bars and between said last-named tungsten carbide sleeve and the sleeve mounted on the other of said members, said passageways communicating with said housing member above said second radial bearing and with the end of said housing member.

25. In a fluid motor, which includes a rotor, a stator, a tubular drive shaft connected to said rotor, housing for said drive shaft, and fluid passageways into the stator, an outlet from said stator and into and through the tubular drive shaft, a by-pass passageway connected to said stator outlet, the improvement which includes a thrust bearing assembly mounted between said housing and said drive shaft in thrust transmission relationship between said housing and said shaft, radial bearings in said housing between said housing and said shaft and positioned in said housing between said thrust bearing and said stator, comprising a tungsten carbide sleeve mounted in said housing, tungsten carbide complementary bearing mounted on said shaft in rubbing relationship to said first-mentioned bearing member, said complementary bearing mounted on said shaft is a sleeve of exterior diameter less than the interior diameter of the tungsten carbide sleeve mounted in said housing carrying a plurality of tungsten carbide bars mounted circumambiently about said sleeve on said shaft and in rubbing contact with said tungsten carbide sleeve, mounted on said housing, interrupted annular passageways between said bars and between said tungsten carbide sleeve and the sleeve mounted on said shaft.

26. In the motor of claim 25, a second radial bearing positioned in said housing between said thrust bearing and the end of said housing, said radial bearing comprising a tungsten carbide sleeve mounted in said housing, tungsten carbide complementary bearing mounted on said shaft in rubbing relationship to said firstmentioned bearing member.

27. In the motor of claim 25, a second radial bearing positioned in said housing between said housing and said shaft and positioned between said thrust bearing and the end of said housing, said second radial bearing including a sleeve mounted on said shaft and of exterior diameter less than the interior diameter of the first-mentioned tungsten carbide sleeve, a plurality of tungsten carbide bars mounted circumambiently about said sleeve on said shaft and in rubbing contact with said first-mentioned sleeve, interrupted annular passageways between said bars and between said first-mentioned tungsten carbide sleeve and the sleeve mounted on said shaft, said passageways communicating with said housing above said second radial bearing and with the end of said housing.

* * * * *